US007008098B2

(12) United States Patent
Yamaguchi et al.

(10) Patent No.: US 7,008,098 B2
(45) Date of Patent: Mar. 7, 2006

(54) VEHICLE HEADLAMP ASSEMBLY WITH LAMPSHADE AND LIGHTING CIRCUIT SEPARATELY MOUNTED TO REFLECTOR

(75) Inventors: Hironao Yamaguchi, Gamagori (JP); Kenji Yoneima, Anjo (JP)

(73) Assignee: Denso Corporation, Kariya (JP)

( * ) Notice: Subject to any disclaimer, the term of this patent is extended or adjusted under 35 U.S.C. 154(b) by 225 days.

(21) Appl. No.: 10/141,951

(22) Filed: May 10, 2002

(65) Prior Publication Data

US 2002/0167819 A1 Nov. 14, 2002

(30) Foreign Application Priority Data

May 14, 2001 (JP) ............................ 2001-143484
May 21, 2001 (JP) ............................ 2001-151281

(51) Int. Cl.
*B60Q 1/00* (2006.01)
*F21V 11/00* (2006.01)

(52) U.S. Cl. ...................... 362/547; 362/264; 362/294; 362/548

(58) Field of Classification Search ................ 362/351, 362/509, 539, 546–548, 294, 264, 265, 361
See application file for complete search history.

(56) References Cited

U.S. PATENT DOCUMENTS 5,607,228 A * 3/1997 Ozaki et al. ................ 362/263
5,865,531 A 2/1999 Frey et al.
6,328,455 B1 * 12/2001 Helbig ....................... 362/226
6,474,854 B1 * 11/2002 Ohshio ....................... 362/512
2001/0015897 A1 * 8/2001 Aida et al. .................. 362/519

FOREIGN PATENT DOCUMENTS

JP A-10-228804 8/1998
JP A-2000-235809 8/2000

* cited by examiner

*Primary Examiner*—Sandra O'Shea
*Assistant Examiner*—Guiyoung Lee
(74) *Attorney, Agent, or Firm*—Posz Law Group, PLC

(57) ABSTRACT

In a headlamp assembly, a reflector unit includes a bearing surface for supporting a lighting control circuit. The lighting control circuit is mounted to the backside of the reflector unit across a holder, and directly connected to a discharge bulb. The reflector unit further includes a mounting portion to which a lampshade unit is mounted. In the reflector unit, the backside of the mounting portion is offset from the bearing surface in both of the axial direction and the radial direction. That is, the lampshade unit and the holder are fixed to the reflector unit so as to be distanced from each other. Thus the holder is thermally disconnected from the lampshade unit, and thereby the heat transfer from the lampshade unit to the lighting control circuit is reduced.

6 Claims, 5 Drawing Sheets

VEHICLE HEADLAMP ASSEMBLY WITH LAMPSHADE AND LIGHTING CIRCUIT SEPARATELY MOUNTED TO REFLECTOR

CROSS REFERENCE TO RELATED APPLICATION

The present application is based on and incorporates herein by reference Japanese Patent Applications No. 2001-143484 filed on May 14, 2001 and No. 2001-151281 filed on May 21, 2001.

BACKGROUND OF THE INVENTION

1. Field of the Invention

The present invention relates to a vehicle headlamp assembly that employs a discharge lamp, which is especially suitable for an automobile.

2. Related Art

Nowadays a discharge lamp is often employed as a vehicle headlamp. The discharge lamp is an arc discharge lamp which generates light by means of an internal electrical discharge between a pair of electrodes in a discharge bulb (arc tube) filled with xenon. The discharge lamp can generate white light close to sunlight. Further the discharge lamp can generate light in double intensity using 70% reduced energy in comparison with a conventional halogen lamp. Accordingly the visibility is improved if the discharge lamp is employed as a headlamp of a vehicle.

In this case, the vehicle should include a lighting control circuit dedicated to the discharge lamp. The lighting control circuit includes a converter, an inverter and an igniter. The converter converts a d.c. voltage supplied by the battery into a higher voltage. The inverter converts the d.c. voltage into an a.c. voltage. The igniter generates a high voltage of few score kilovolts required for starting the discharge lamp.

When the discharge lamp is turned on, the lighting control circuit applies a high voltage of several kilovolts or few score kilovolts to the discharge lamp so that electrical discharge immediately begins. Thus the discharge lamp is instantaneously started. Thereafter the lighting control circuit keeps the discharge lamp on by supplying power of approximately 35 W to the discharge lamp.

The lighting control circuit is usually installed outside the housing of a headlamp assembly in the vehicle. In this case, a wire for transferring the high voltage should be connected between the lighting control circuit and the discharge lamp, and further a connector is required to connect the wire to the discharge lamp. Therefore the headlamp assembly cannot be miniaturized and occupies a relatively large space in the vehicle. Further a relatively large amount of manpower is required for mounting and wiring the headlamp assembly in or to the vehicle. Further a shield is required for blocking electrical noises generated in the wire, and thereby costs are increased.

Then it is proposed that the lighting control circuit is disposed in the headlamp housing so that the lighting control circuit may be directly connected to the discharge bulb. For example, the lighting control circuit is fixed to a holder (i.e., fixture) mounted to the backside of a reflector. However a lampshade, which is provided in the vicinity of the discharge bulb for partially shielding light radiated from the discharge bulb, is also mounted to the reflector. Then it is proposed that the holder is laid on the lampshade on the reflector so that the lampshade and the holder may be together fastened to the reflector. According to this construction, the headlamp assembly can be miniaturized and the wire for transferring the high voltage is not required. As a result, noises and/or the power loss due to transmission of the high voltage through the wire are prevented.

However, while the discharge bulb is lighted, the discharge bulb has a high temperature. According to the above construction, the holder is in touch with the lampshade, that is, it is thermally connected to the lampshade, and therefore lampshade-to-holder thermal resistance is low. Accordingly the heat radiated from the discharge bulb is transferred to the lighting control circuit via the lampshade and the holder.

As a result, the lighting control circuit will rise in temperature while the discharge bulb is on, and the heat load on the circuit elements of the lighting control circuit will be increased. In order to overcome this problem, circuit elements and a substrate which have high heat-resistance may be employed. However, in this case, the costs are increased and the headlamp assembly is increased in size.

SUMMARY OF THE INVENTION

The present invention has an object to provide a vehicle headlamp assembly in which a lampshade and a lighting circuit are separately mounted to a reflector so as to be thermally disconnected from each other.

A vehicle headlamp assembly according to the present invention includes a discharge bulb, a reflector, a lampshade, a lighting circuit, and a housing. The discharge bulb, the reflector and the lighting circuit are disposed in the housing. The reflector is provided for reflecting light radiated from the discharge bulb forward. The lampshade partially shields the light radiated from the discharge bulb. The lighting circuit is mounted to the backside of the reflector across a fixture, and directly connected to the discharge bulb for lighting the discharge bulb. The fixture is mounted to the reflector so as to be distanced from the lampshade. While the discharge bulb is lighted, the lampshade rises in temperature due to the heat radiated from the discharge bulb. However, according to the present construction, the heat transfer from the lampshade to the lighting circuit is reduced, because the fixture is thermally disconnected from the lampshade.

Preferably, a heat shield member is disposed between the lampshade and the fixture so that the heat transfer from the lampshade to the lighting circuit is further reduced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT (First Embodiment)

Figure 1:
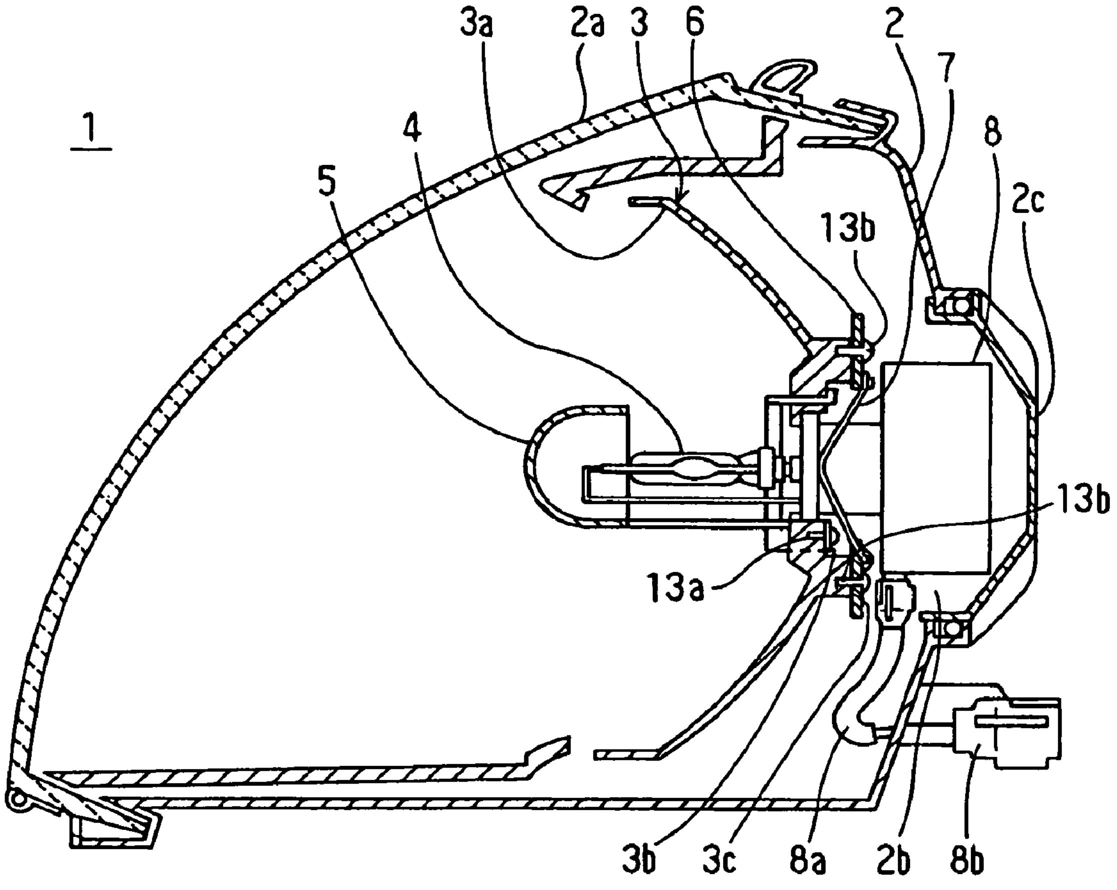
FIG. 1 is a vertical section of a headlamp assembly according to a first embodiment of the present invention.

Referring to FIG. 1, a headlamp assembly 1 according to a first embodiment of the present invention includes a reflector unit 3, a discharge bulb 4, a lampshade unit 5, a lighting control circuit 8, and a holder 6 as a fixture in its housing 2. The left side of FIG.1 corresponds to the front side of a vehicle. The housing 2 is a resinous molding, and includes a translucent lens 2*a* integrated therewith as shown in FIG. 1. The reflector unit 3, the discharge bulb 4, and the lighting control circuit 8 are housed in the housing 2.

The reflector unit 3 includes a concave reflector 3*a* on its front side (i.e., discharge bulb side). The discharge bulb 4 is partially covered with the lampshade unit 5 so that light radiated by the discharge bulb 4 does not travel straightforward. The holder 6 is mounted to the backside of the reflector unit 3. The lighting control circuit 8 is fixed to and retained by the holder 6. Thus the lighting control circuit 8 is mounted to the backside of the reflector unit 3 across the holder 6.

Figure 2:
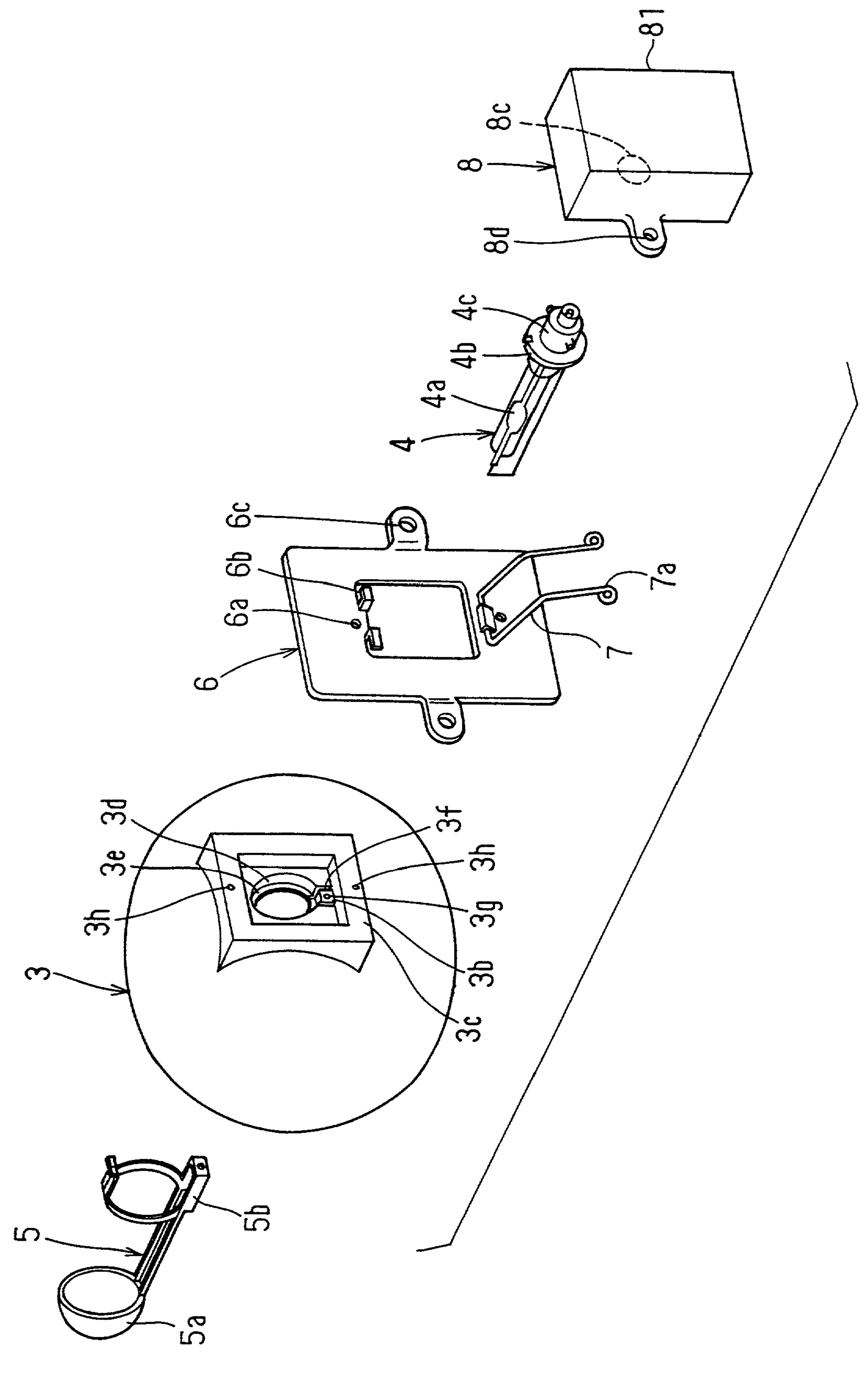
FIG. 2 is an exploded perspective view of the main parts of the headlamp assembly shown in FIG. 1.

The housing 2 includes an opening 2*b* corresponding to the lighting control circuit 8. The opening 2*b* is generally circular, and constructed so that the holder 6 and the lighting control circuit 8 can be mounted to the reflector unit 3 disposed in the housing 2 through the opening 2*b*. A cover member 2*c* is airtightly mounted to the housing 2 so as to close up the opening 2*b*. Thereby water and/or foreign matter are prevented from getting into the housing Referring to FIG. 2, the discharge bulb 4 includes a lamp 4*a*, and further includes a flange 4*b* and a male connector 4*c* on one side of the lamp 4*a*. The flange 4*b* is engaged with and retained by the reflector unit 3. The connector 4*c* is electrically connected to the lighting control circuit 8.

The lampshade unit 5 is made of metal and includes a generally semispherical lampshade 5*a* and a supporting portion 5*b*. One end of the supporting portion 5*b* supports the lampshade 5*a*, while the other end is fixed to the reflector unit 3. The lampshade 5*a* is arranged so as to shield the front portion of the discharge bulb 4. Thereby the straightforward component of the light emitted by the discharge bulb 4 is blocked. As a result, light radiated forward includes only the light reflected by the reflector 3*a*. That is, the light which has an intensity distribution provided by the reflector 3*a* is radiated forward. The lampshade 5*a* also blocks electromagnetic noises which are radiated from the discharge bulb 4 straightforward. The supporting portion 5*b* of the lampshade unit 5 is screwed to the reflector unit 3.

The reflector unit 3 includes the reflector 3*a* on its front side as described above, and further includes a retainer 3*d* at its center. The reflector unit 3 is made of more than two kinds of materials including both of metal and nonmetal (e.g., resin). For example, the reflector unit 3 is originally made of resin, and thereafter aluminum is deposited on the surface of the resinous structure.

In order that the headlamp assembly 1 may serve a predetermined function, the discharge bulb 4 (particularly the lamp 4*a* ) should be arranged in a predetermined position with respect to the reflector 3*a*. Therefore the reflector unit 3 includes a stopper 3*e* for positioning the discharge bulb 4. The flange 4*b* of the discharge bulb 4 is engaged with the retainer 3*d* of the reflector unit 3, and the light-side end face of the flange 4*b* is brought into intimate contact with the stopper 3*e* of the reflector unit 3. Thereby the discharge bulb 4 is held exactly in the predetermined position with respect to the reflector unit 3.

The reflector 3*a* of the reflector unit 3 reflects forward the light radiated from the discharge bulb 4. The reflector 3*a* is constructed so that the light reflected by the reflector 3*a* has the predetermined intensity distribution as described above. The reflector unit 3 includes a mounting portion 3*b*, serving as a lampshade securing member mounting portion, for supporting the lampshade unit 5, and further includes guide groove 3*f* for positioning the supporting portion 5*b* of the lampshade unit 5. The lampshade unit 5 is screwed to the reflector unit 3 using a threaded hole 3*g* formed on the backside of the mounting portion 3*b*.

The reflector 3 unit further includes a bearing surface 3*c*, serving as fixture securing member mounting portion, on which the holder 6 is disposed, and the bearing surface 3*c* includes threaded holes 3*h*. Thereby the holder 6 is mounted to the reflector unit 3, and then the lighting control circuit 8 is mounted to the holder 6. That is, the lighting control circuit 8 is fixed to the reflector unit 3 across the holder 6 as described above. The mounting portion 3*b* is offset from the bearing surface 3*c* in both of the axial direction and the radial direction of the reflector unit 3. That is, the lampshade unit 5 and the holder 6 are mounted to the reflector unit 3 so as to be at a predetermined distance from each other.

The lighting control circuit 8 includes electrical circuits in a rectangular parallelepiped casing 81, and thereby starts the discharge bulb 4. The electrical circuits include a converter, an inverter and an igniter. The converter converts a d.c. voltage supplied by the battery (not shown) into a higher voltage. The inverter converts the d.c. voltage into an a.c. voltage. The igniter generates a high voltage of few score kilovolts required for starting the discharge bulb 4.

The lighting control circuit 8 includes a built-in female connector 8*c*. The discharge bulb 4 is directly connected to the female connector 8*c* without using a wire lead. A lead wire 8*a* with a connector 8*b* is connected to the lighting control circuit 8, and the power from the battery is supplied to the lighting control circuit 8 through the lead wire 8*a*. The casing 81 includes mounting holes 8*d*, and thereby the lighting control circuit 8 is fixed to the holder 6.

The holder 6 is made of resin or metal. The holder 6 includes holes 6*a*, and thereby screwed to the bearing surface 3*c* of the reflector unit 3. The holder 6 further includes threaded holes 6*c* to which the lighting control circuit 8 is fixed. A spring 7 for biasing the discharge bulb 4 against the reflector unit 3 is pivotably supported by the holder 6. Further the holder 6 includes latches 6*b* for holding the ends 7*a* of the spring 7.

The present headlamp assembly 1 is assembled as follows. First, the supporting portion 5*b* of the lampshade unit 5 is put through the reflector unit 3 from the front side of the reflector unit 3, and thereafter engaged with the guide grooves 3*f* of the reflector unit 3. Then the lampshade unit 5 is fixed to the reflector unit 3 by engaging a screw 13*a*, serving as a lampshade securing member, with the threaded hole 3*g* of the mounting portion 3*b*. Thus the lampshade unit 5 is mounted to the reflector unit 3.

Next the reflector unit 3 with the lampshade unit 5 is incorporated in the housing 2, and thereafter the lens 2*a* is airtightly adhered to the housing 2.

The holder 6 is put into the housing 3 through the opening 2*b*, and fixed to the bearing surface 3*c* of the reflector unit 3 by engaging screws 13*b* , serving as fixture securing members, with the holes 6*a* of the holder 6 and the threaded holes 3*h* of the reflector unit 3. The spring 7 is pivotably mounted to the holder 6 beforehand. Next, the discharge bulb 4 is put into the housing 2 through the opening 2*b*, and mounted to the reflector unit 3 so that the flange 4*b* of the discharge bulb rests in the retainer 3*d* of the reflector unit 3 and the end face of the flange 4*b* is in intimate contact with the stopper 3*e*. Thereafter the ends 7*a* of the spring 7 are hooked onto the latches 6*b* so that the discharge bulb 4 is biased against the reflector unit 3.

Then the male connector 4*c* of the discharge bulb 4 is inserted into the female connector 8*c* of the lighting control circuit 8, and thereafter the lighting control circuit 8 is fixed to the holder 6 by engaging screws with the mounting holes 8*d* of the lighting control circuit 8 and the threaded holes 6*c* of the holder 6. Thus the lighting control circuit 8 is mounted to the backside of the reflector unit 3. Finally, the cover member 2*c* is airtightly attached to the housing 2 so as to close up the opening 2*b*, and then the assembly is finished.

The discharge bulb 4 can be replaced through the opening 2*b* and further the lighting control circuit 8 can be overhauled through the opening 2*b*, even when the headlamp assembly 1 is mounted in the vehicle According to the present embodiment, the following advantages are provided. In the reflector unit 3, the mounting portion 3*b* is offset from the bearing surface 3*c* in both of the axial direction and the radial direction of the reflector unit 3. That is, the lampshade unit 5 and the holder 6 are mounted to the reflector unit 3 so as to be at a predetermined distance from each other as described above. The holder 6 is thus thermally disconnected from the lampshade unit 5, and therefore the shade-to-holder thermal resistance is high. Thereby the heat transfer from the discharge bulb 4 to the lighting control circuit 8 is restrained. According to the present embodiment, the heat load on the circuit elements of the lighting control circuit 8 is reduced by simple means without increasing costs and the number of parts.

Further the heat generated by the lighting control circuit 8 can be blown off through the holder 6, if the holder 6 is made of a material (e.g., metal) which has high heat conductance.

The entire or the igniter of the lighting control circuit 8 corresponds to a lighting circuit of the present invention.

(Second Embodiment)

Figure 3:
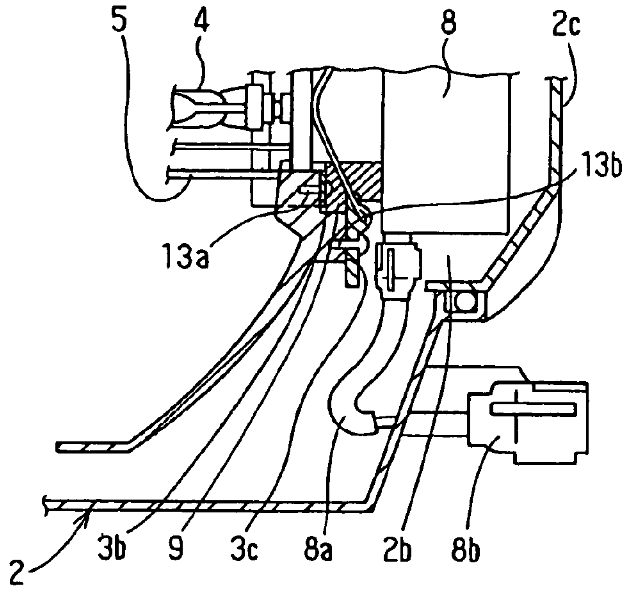
FIG. 3 is a fragmentary sectional view of a headlamp assembly according to a second embodiment of the present invention.

Referring to FIG. 3, a headlamp assembly according to a second embodiment of the present invention includes a spacer 9 as a heat shield member between the lampshade unit 5 and the lighting control circuit 8. The spacer 9 is made of a material which has a superior heat insulation property, for example resin or ceramics. The spacer 9 is fixed to the reflector unit 3 or the lighting control circuit 8 by adhesive. For example, the spacer 9 is adhered to the lighting control circuit 8. Further a gap (i.e., airspace) may be formed between the spacer 9 and the lampshade unit 5 in this case.

The other portions of the headlamp assembly are similar to the first embodiment. According to the present embodiment, the heat transfer from the lampshade unit 5 to the lighting control circuit 8 by radiation is suppressed, and thereby the heat load on the circuit elements of the lighting control circuit 8 is further reduced.

(Third Embodiment)

Figure 4:
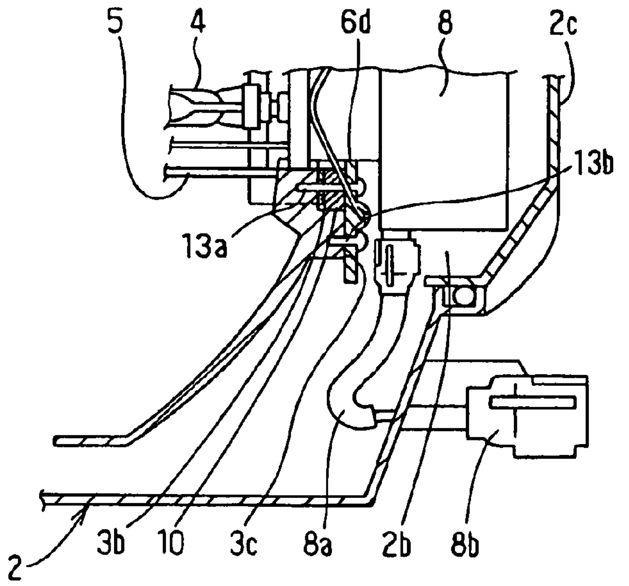
FIG. 4 is a fragmentary sectional view of a headlamp assembly according to a third embodiment of the present invention.

According to a third embodiment of the present invention, a headlamp assembly includes a holder which has a mounting portion 6*d* to which the lampshade unit 5 is fixed by a screw 13*a*, serving as a lampshade securing member, as shown in FIG. 4. A spacer 10 is disposed as a heat shield member between the lampshade unit 5 mounted to the reflector unit 3 and the mounting portion 6*d*, and then the lampshade unit 5 and the holder are together screwed to the reflector unit 3. The spacer 10 is made of a material which has a superior heat insulation property and high strength, for example resin or ceramics. Since the axial force is applied to the spacer 10 by the screw, the spacer 10 should be sufficiently strong to withstand the applied axial force. The other portions of the headlamp assembly are similar to the first embodiment.

According to the present embodiment, the spacer 10 reduces the heat transfer from the lampshade unit 5 to the holder 6, and therefore the heat load on the circuit elements of the lighting control circuit 8 is reduced.

(Fourth Embodiment)

Figure 5:
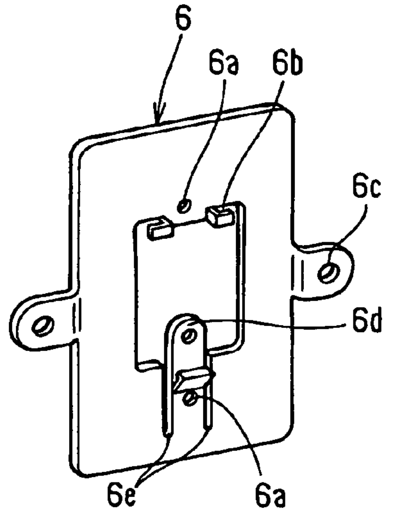
FIG. 5 is a perspective view of a holder included in a headlamp assembly according to a fourth embodiment of the present invention.

According to a fourth embodiment of the present invention, a headlamp assembly includes a holder 6 different in shape from that of the third embodiment as shown in FIG. 5. According to the third embodiment, the spacer 10 nearly suppresses the heat transfer from the lampshade unit 5 to the holder, but the heat may be slightly transferred from the lampshade unit 5 to the mounting portion 6*d* of the holder through the screw by which the lampshade unit 5 and the holder 6 are together fastened to the reflector unit 3.

In view of this problem, the holder 6 according to the present embodiment includes slits 6*e* formed on the base of the mounting portion 6*d*, so that the area through which the heat is conducted from the mounting portion 6*d* to the other portions of the holder 6 is reduced. Thus the heat load on the circuit elements of the lighting control circuit 8 is reduced. The holder 6 actually includes a spring for biasing a discharge bulb against the reflector unit, but the spring is omitted in FIG. 5. The other portions of the headlamp assembly are similar to the first embodiment.

(Fifth embodiment)

Figure 6:
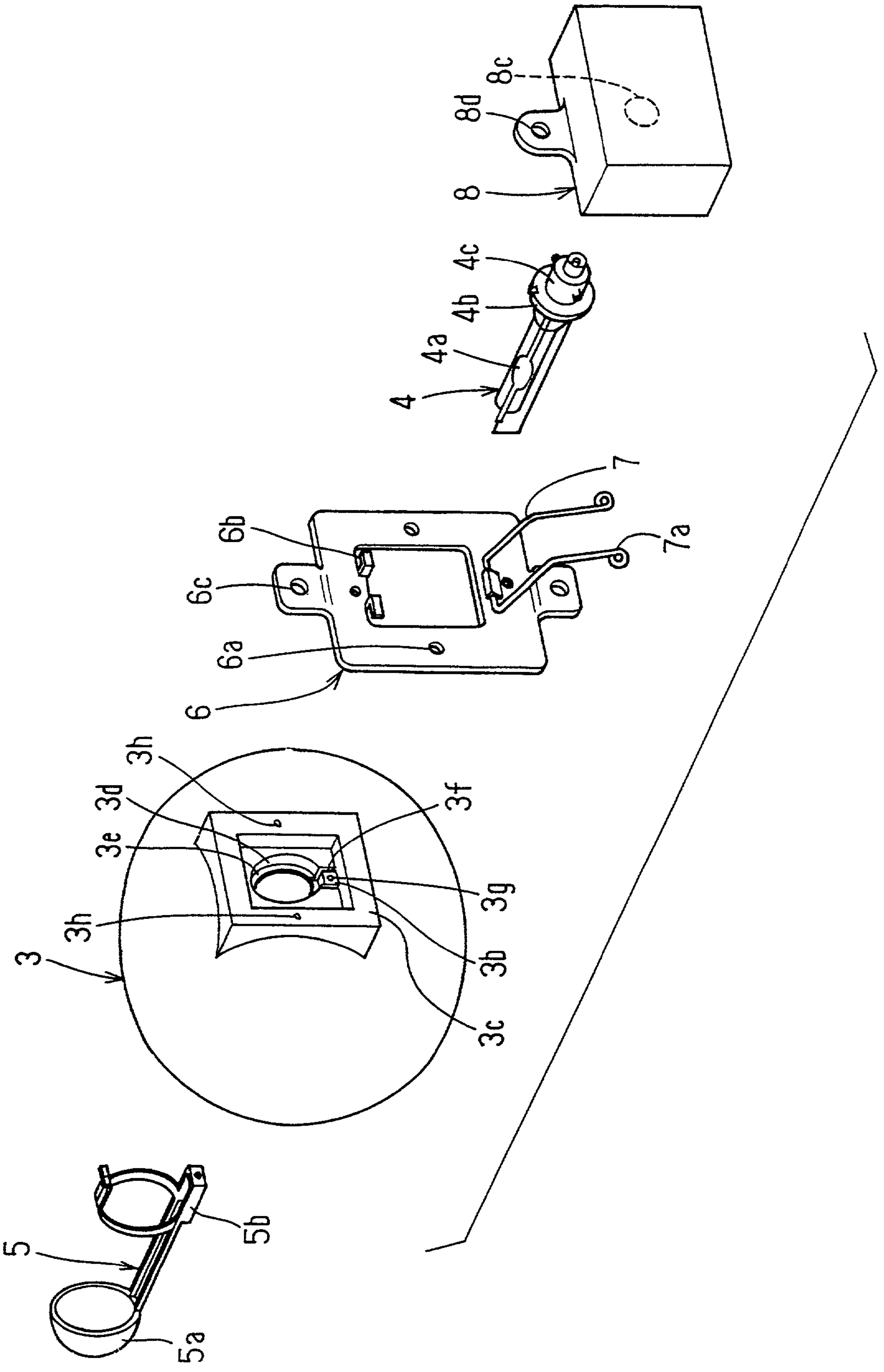
FIG. 6 is an exploded perspective view of the main parts of a headlamp assembly according to a fifth embodiment of the present invention.

Referring to FIG. 6, a headlamp assembly according to a fifth embodiment of the present invention includes a holder 6 different in shape from that of the first embodiment. In the holder 6 of the first embodiment, the holes 6*a* used for fixing the holder 6 to the reflector unit 3 are arranged on the upper and lower portions of the holder 6, while the threaded holes 6*c* used for fixing the lighting control circuit 8 to the holder 6 are arranged on the side portions of the holder 6. In contrast, according to the present embodiment, the holes 6*a* used for fixing the holder 6 to the reflector unit 3 are arranged on the side portions of the holder 6, while the threaded holes 6*c* used for fixing the lighting control circuit 8 to the holder 6 are arranged on the upper and lower portions of the holder 6.

Accordingly the threaded holes 3*h* corresponding to the holes 6*a* of the holder 6 is formed on the bearing surface 3*c* of the reflector unit 3 so as to be farther from the threaded hole 3*g* in comparison with the first embodiment. As a result, the heat transfer from the lampshade unit 5 to the holder 6 is further reduced, and thereby the heat load on the circuit elements of the lighting control circuit 8 is further reduced. The other portions of the headlamp assembly are similar to the first embodiment.

(Sixth Embodiment)

Figure 7:
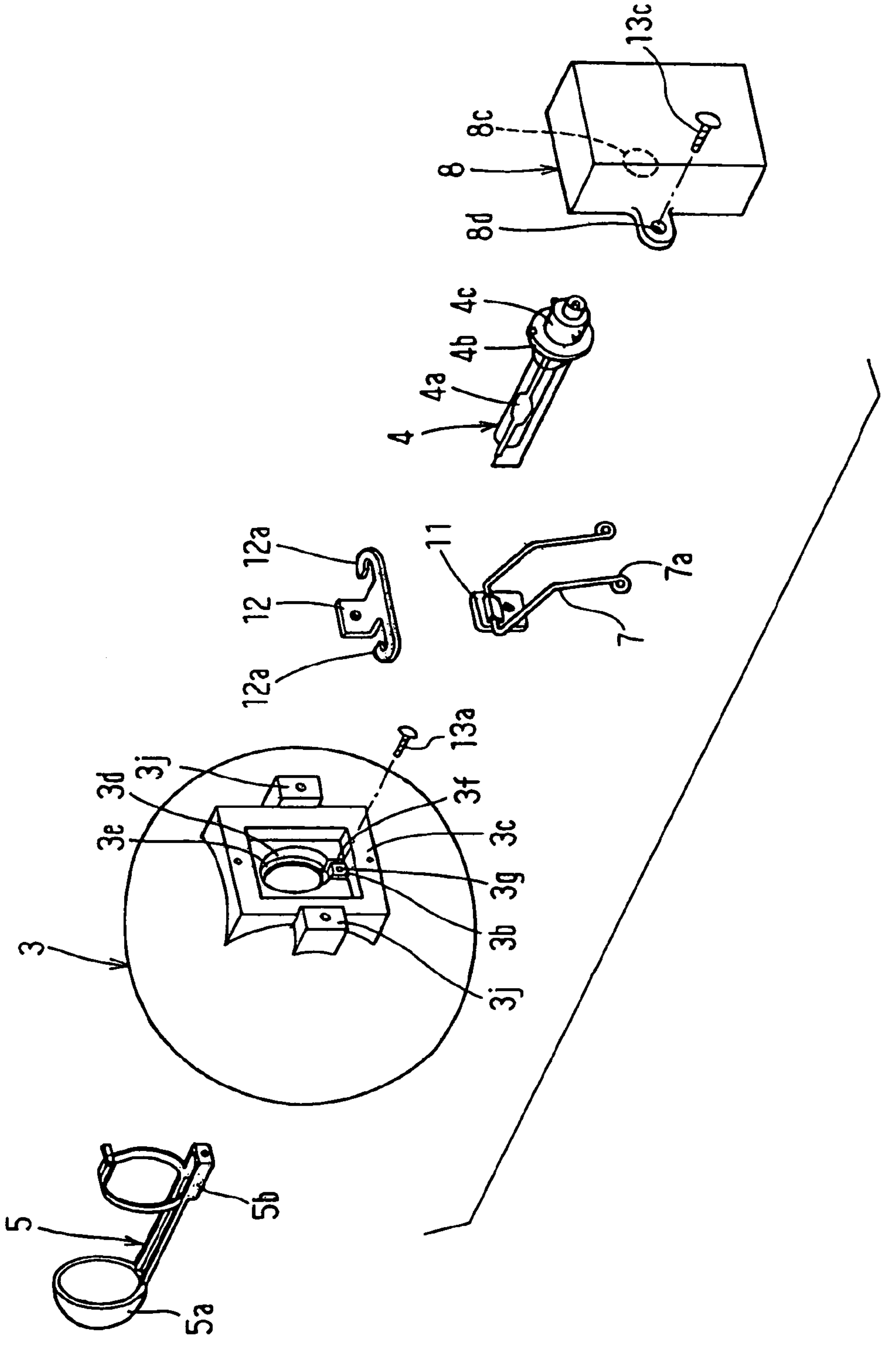
FIG. 7 is an exploded perspective view of the main parts of a headlamp assembly according to a sixth embodiment of the present invention.

Referring to FIG. 7, in a headlamp assembly according to a sixth embodiment of the present invention, a lighting control circuit 8 is directly mounted to the backside 3*c* of a reflector unit 3 without disposing a holder between the lighting control circuit 8 and the reflector unit 3. A spring support 11 and a latch 12 are screwed to the backside 3*c* of the reflector unit 3. The spring support 11 pivotably supports a spring 7 provided for biasing a discharge bulb 4 against the reflector unit 3. The latch 12 includes hooks 12*a* for holding the respective ends 7*a* of the spring 7.

The reflector unit 3 further includes a first mounting portion 3*b* for supporting the lampshade unit 5 through use of a screw 13*a*, serving as a lampshade securing member, and second mounting portions 3*j*, serving as circuit securing member mounting portions, for supporting the lighting control circuit 8 through use of screws 13*c*, serving as circuit securing members. The backside of the first mounting portion 3*b* is offset from the backside of the second mounting portions 3*j* in both of the axial direction and the radial direction of the reflector unit 3. Thereby the heat transfer from the lampshade unit 5 to the lighting control circuit 8 is reduced, and therefore the heat load on the circuit elements of the lighting control circuit 8 is reduced.

(Modifications)

In the sixth embodiment, a spacer may be disposed between the lampshade unit 5 and the lighting control circuit 8. The spacer reduces the heat transfer from the lampshade unit 5 to the lighting control circuit 8, and thereby the heat load on the circuit elements of the lighting control circuit 8 is reduced.

In the above embodiments, the entire of the lighting control circuit 8 is provided as a single part. However, the lighting control circuit 8 may consist of a plurality of separate portions. For example, the lighting control circuit 8 consists of two portions, that is, a first portion and a second portion. The first portion includes only the igniter. The second portion includes the converter and the inverter. In this case, the first portion (i.e., igniter) may be fixed to the reflector unit 3, and the second portion may be fixed in another appropriate position within the housing 2. The second portion is connected with the first portion by a wire.

The present invention is not limited to the above embodiments and modifications, but may be variously embodied within the scope of the invention.

What is claimed is:

1. A vehicle headlamp assembly comprising:

a discharge bulb;

a reflector that reflects light radiated from said discharge bulb;

a lampshade that is mounted to said reflector by at least one lampshade securing member and partially shields the light radiated from said discharge bulb;

a lighting circuit that lights said discharge bulb, wherein:

said lighting circuit is spaced from said lampshade and is fixed in a predetermined position on a backside of said reflector by at least one circuit securing member, which is spaced from said at least one lampshade securing member; and said lighting circuit is directly connected to said discharge bulb;

a heat shield member, which is formed separately from said reflector, disposed between said lampshade and said lighting circuit, wherein a position at which the lampshade is fixed to the heat shield member is different from a position at which the lighting circuit is fixed to the heat shield member; and a housing that receives said discharge bulb, said reflector and said lighting circuit.

2. A vehicle headlamp assembly as in claim 1, wherein said at least one lampshade securing member and said at least one circuit securing member are installed to said reflector on said backside of said reflector.

3. A vehicle headlamp assembly as in claim 2, wherein:

said reflector includes:

at least one lampshade securing member mounting portion, at which said at least one lampshade securing member is secured to said reflector; and at least one circuit securing member mounting portion, at which said at least one circuit securing member is secured to said reflector; and said at least one lampshade securing member mounting portion is displaced from said at least one circuit securing member mounting portion in an axial direction of said reflector.

4. A vehicle headlamp assembly as in claim 3, wherein:

each of said at least one lampshade securing member is a screw, which is threadably engaged with said reflector and said lampshade; and each of said at least one circuit securing member is a screw, which is threadably engaged with said reflector and said lighting circuit.

5. A vehicle headlamp assembly as in claim 1, wherein:

said lighting circuit includes a built-in female connector; and said discharge bulb is directly connected to said lighting circuit through said built-in female connector.

6. A vehicle headlamp assembly as in claim 5, wherein said discharge bulb is directly connected to said lighting circuit through said built-in female connector without a lead wire.

* * * * *

UNITED STATES PATENT AND TRADEMARK OFFICE

CERTIFICATE OF CORRECTION

PATENT NO. : 7,008,098 B2
APPLICATION NO. : 10/141951
DATED : March 7, 2006
INVENTOR(S) : Hironao Yamaguchi It is certified that error appears in the above-identified patent and that said Letters Patent is hereby corrected as shown below:

Title page

Correct Item (75) to read:

Hironao Yamaguchi, Gamagori (JP)

Signed and Sealed this

Eighteenth Day of July, 2006

JON W. DUDAS
*Director of the United States Patent and Trademark Office*